(12) United States Patent
Voigt

(10) Patent No.: US 8,746,518 B2
(45) Date of Patent: Jun. 10, 2014

(54) SPACER FOR SPACING WHEEL RIM FROM COMPARTMENT FLOOR

(75) Inventor: Derik Thomas Voigt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 13/270,714

(22) Filed: Oct. 11, 2011

(65) Prior Publication Data

US 2013/0088070 A1  Apr. 11, 2013

(51) Int. Cl.
- *B62D 43/02* (2006.01)
- *B60R 9/00* (2006.01)
- *B62D 43/00* (2006.01)

(52) U.S. Cl.
USPC ............... 224/42.11; 224/42.12; 296/37.2; 414/463; D12/202

(58) Field of Classification Search
USPC ............ 224/42.11, 42.12; 296/37.2; 414/463; D12/202
IPC ........................................................ B62D 43/02
See application file for complete search history.

(56) References Cited

U.S. PATENT DOCUMENTS

| | | | | |
|---|---|---|---|---|
| 1,550,447 A | * | 8/1925 | Neely | 224/42.23 |
| 1,610,722 A | * | 12/1926 | Sheetz | 224/42.23 |
| 1,679,972 A | * | 8/1928 | Hunt | 224/42.14 |
| 2,063,092 A | * | 12/1936 | Groden | 414/463 |
| RE21,171 E | | 8/1939 | Biszantz | |
| 2,631,886 A | * | 3/1953 | Keller | 296/37.2 |
| 2,839,232 A | * | 6/1958 | Homeier | 224/42.12 |
| 4,174,797 A | * | 11/1979 | Yasue et al. | 224/42.21 |
| 4,498,614 A | * | 2/1985 | Guarr | 224/42.13 |
| 5,799,845 A | * | 9/1998 | Matsushita | 224/42.14 |
| 6,467,829 B2 | * | 10/2002 | Kaluszka et al. | 296/37.3 |
| 6,648,577 B2 | * | 11/2003 | Obriot | 414/463 |
| 7,036,697 B2 | * | 5/2006 | Hwang et al. | 224/42.14 |
| 7,182,382 B2 | * | 2/2007 | Harima et al. | 296/37.2 |
| 7,770,764 B2 | * | 8/2010 | Rock et al. | 224/42.23 |
| 2006/0017301 A1 | | 1/2006 | Edwards | |
| 2008/0073390 A1 | * | 3/2008 | Venuto et al. | 224/42.12 |

FOREIGN PATENT DOCUMENTS

| | | |
|---|---|---|
| JP | 62-12481 | 1/1987 |
| JP | 2007-91072 | 4/2007 |

\* cited by examiner

*Primary Examiner* — Adam Waggenspack
*Assistant Examiner* — Derek Battisti
(74) *Attorney, Agent, or Firm* — Rankin, Hill & Clark LLP

(57) ABSTRACT

A spacer for spacing a spare wheel assembly from a vehicle floor of a vehicle compartment is provided. The spacer includes an annular body, an outer flange, and an inner flange. The annular body includes an upper surface for facing toward the spare wheel assembly and a lower surface for facing toward the floor and away from the spare wheel assembly. The annular body further includes a peripheral edge and an inner edge. The outer flange extends from the upper surface and is configured to contact a wheel rim of the spare wheel assembly. The inner flange is offset radially inwardly from the outer flange and extends from the upper surface. The inner flange is configured to contact the wheel rim of the spare wheel assembly offset from where the outer flange is configured to contact the wheel rim.

19 Claims, 3 Drawing Sheets

US 8,746,518 B2

SPACER FOR SPACING WHEEL RIM FROM COMPARTMENT FLOOR

BACKGROUND

Exemplary embodiments herein relate to a temporary or spare tire assembly for a vehicle. More particularly, exemplary embodiments herein relate to a spacer for use with a temporary or spare tire assembly.

Due to market, supplier, or regulation changes over a vehicle production life cycle, there is a potential for a change in a packaging layout for the vehicle since production startup. For example, the supplier of the temporary, or spare, tire may change during the vehicle production life cycle. The change in supplier can result in the use of a different tire than the tire originally used during development while setting up the packaging layout for the vehicle. Such a change in tire size can result in the spare wheel assembly not fitting the same within the spare wheel compartment as compared to the original design. Such a change in design may result in a tire rim of the spare wheel assembly contacting the floor of the spare wheel compartment resulting in an undesirable rattling noise.

SUMMARY

In view of the foregoing, a spacer for spacing a spare wheel assembly from a vehicle floor of a vehicle compartment is provided. The spacer includes an annular body, an outer flange, and an inner flange. The annular body includes an upper surface for facing toward the spare wheel assembly and a lower surface for facing toward the floor and away from the spare wheel assembly. The annular body further includes a peripheral edge and an inner edge. The outer flange extends from the upper surface and is configured to contact a wheel rim of the spare wheel assembly. The inner flange is offset radially inwardly from the outer flange and extends from the upper surface. The inner flange is configured to contact the wheel rim of the spare wheel assembly offset from where the outer flange is configured to contact the wheel rim.

A spare wheel assembly and a spacer in combination is also provided. The spare wheel includes a tire and a wheel rim. The tire is mounted to the wheel rim and includes two sidewalls and a central section extending axially between the two sidewalls. The wheel rim includes a cylindrical section and a center piece. The cylindrical section includes an internal flange and an external flange axially spaced from the internal flange, and an internal step portion and an external step portion axially spaced from the internal step portion. The spacer includes an annular body. The annular body has an upper surface, an outer flange and an inner flange. The upper surface contacts at least one of the sidewalls of the tire. The outer flange extends upwardly from the upper surface and includes a free end contacting at least one of the internal flange and the external flange of the wheel rim. The inner flange extends upwardly from the upper surface and has a distal end contacting at least one of the internal step portion and the external step portion of the wheel rim.

DETAILED DESCRIPTION

Figure 1:
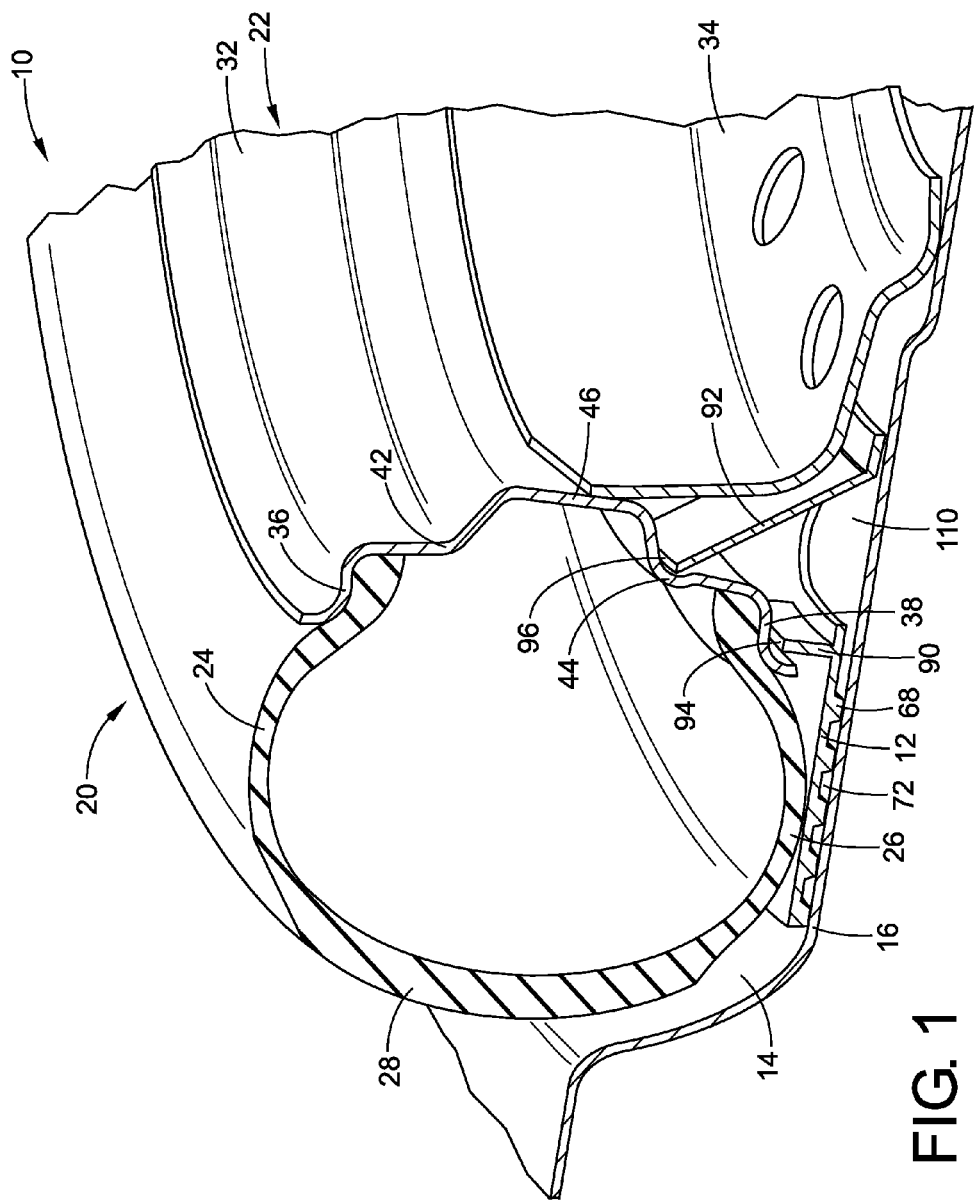
FIG. 1 is a rotated cross-sectional view showing a spacer and spare wheel assembly located in a vehicle compartment.

The descriptions and drawings herein are merely illustrative and various modifications and changes can be made in the structures and steps disclosed without departing from the scope of the appended claims. Various identified components of a vehicle disclosed herein are merely terms of art and may vary from one vehicle manufacturer to another. The terms should not be deemed to limit the present disclosure. The drawings are shown for purposes of illustrating one or more exemplary embodiments and are not for purposes of limiting the appended claims. All references to direction and position, unless otherwise indicated, refer to the orientation of the vehicle components illustrated in the drawings and should not be construed as limiting the appended claims.

FIG. 1 depicts a spare wheel assembly 10 and a spacer 12 disposed in a vehicle compartment 14 having a floor 16. The spacer 12 can appropriately position the spare wheel assembly 10 from the vehicle floor 16 to prevent undesirable rattling. In addition, the spacer 12 can also be used to fix and/or properly position the spare wheel assembly 10 within the vehicle compartment 14.

The spare wheel assembly 10 can be similar to conventional spare wheel assemblies, which are typically found to be stored in a trunk compartment or other suitable compartment of a vehicle. The depicted spare wheel assembly 10 includes a tire 20 and a wheel rim 22. The tire 20 mounts to the wheel rim 22 in a conventional manner. The tire 20 includes two sidewalls, i.e., an interior sidewall 24 and an exterior sidewall 26, and a central section 28 extending axially between the two sidewalls 24, 26. The central section 28 carries the tread (not shown) of the tire 20.

Figure 5:
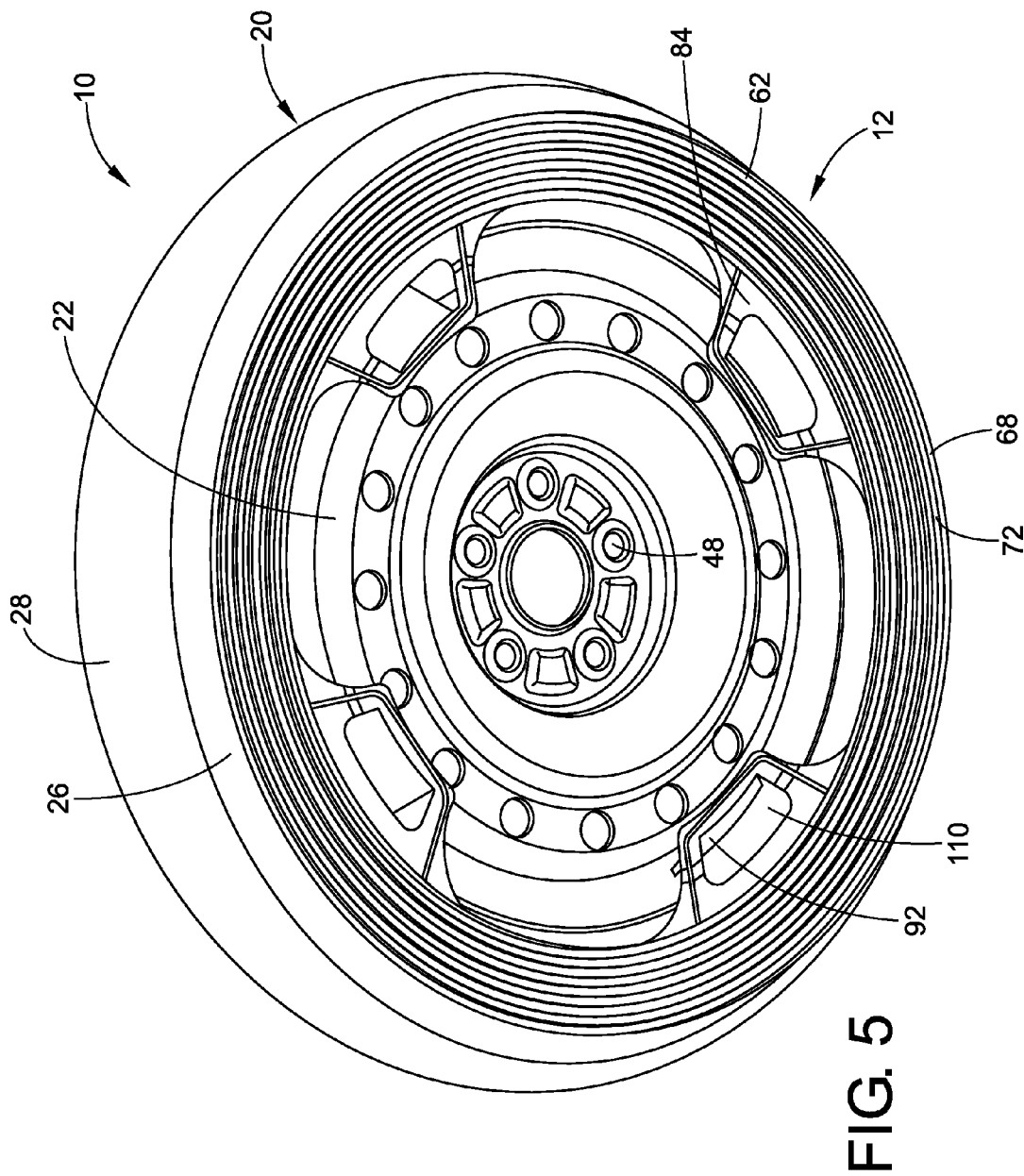
FIG. 5 is a bottom perspective view of the spacer and spare wheel assembly depicted in FIG. 1.

The wheel rim 22 includes a cylindrical section 32 and a center piece 34. The cylindrical section 32 includes an internal flange 36 and an external flange 38 axially spaced from the internal flange. The cylindrical section 32 further includes an internal step portion 42 and an external step portion 44 axially spaced from the internal step portion 42. A central well 46 is disposed between the internal step portion 42 and the external step portion 44. The tire 20 mounts to the cylindrical section 32 of the wheel rim 22 with the respective sidewall 24, 26 being received within and pressed against the respective flange 36, 38. In the illustrated embodiment, the center piece 34 connects with the cylindrical section 32 of the wheel rim 22, but can be integrally formed with the cylindrical section 32. The center piece 34 includes a plurality of bolt holes 48 (FIG. 5), which allow the spare wheel assembly 10 to mount to a wheel hub of the vehicle in a conventional manner.

Figure 2:
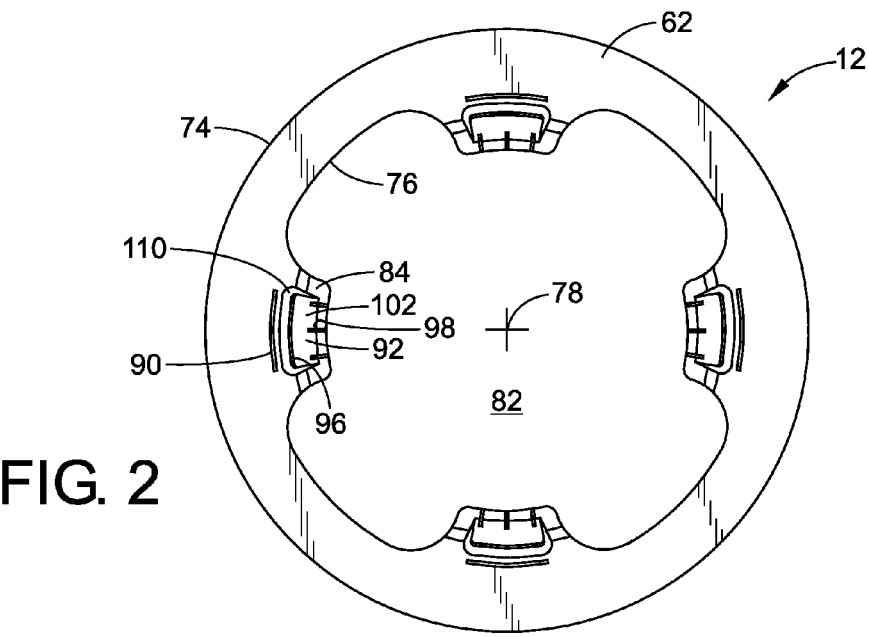
FIG. 2 is a top plan view of the spacer depicted in FIG. 1.
Figure 3:
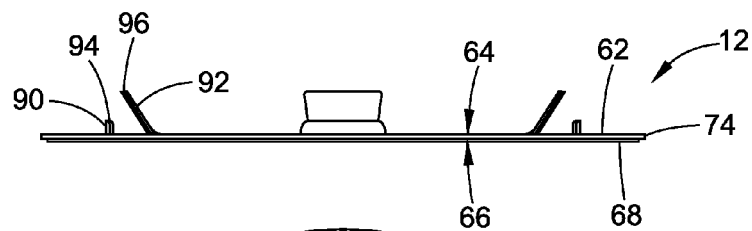
FIG. 3 is a side elevation view of the spacer depicted in FIG. 2.
Figure 4:
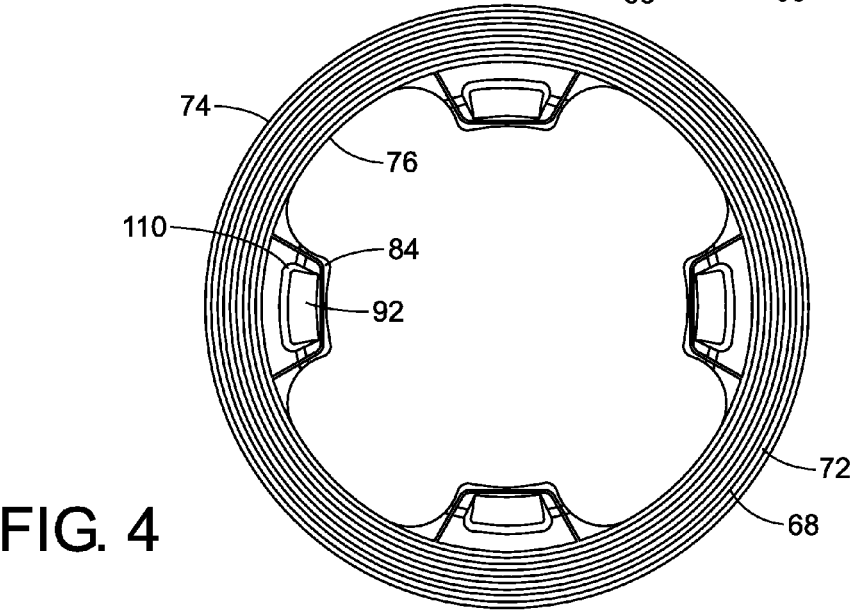
FIG. 4 is a bottom plan view of the spacer depicted in FIG. 2.

With reference to FIGS. 2-4, the spacer 12 includes an annular body 62 including an upper surface 64 and a lower surface 66. With reference back to FIG. 1, the upper surface 64 of the annular body 62 faces toward the spare wheel assembly 10 when the spacer 12 is properly located within the vehicle compartment 14 resting on the floor 16. The lower surface 66 faces toward the floor 16 and away from the spare wheel assembly 10 when the spacer 12 is properly located within the vehicle compartment 14 resting on the floor 16. In the depicted embodiment, the upper surface 64 is substantially flat or planar, though this is not required. Also in the illustrated embodiment, the lower surface 66 of the annular body 62 is corrugated (see FIGS. 1 and 3), though this is not required. As such, the lower surface 66 includes a plurality of annular ridges 68, which define a plurality of annular grooves 72. In an alternative arrangement, the annular body 62 could be corrugated such that annular ridges and grooves would also be provided on the upper surface of the annular body. In any embodiment, the spacer 12 can be made from a rigid material, such as a rigid plastic, and the general thickness, e.g. the thickness between the upper surface 64 and the lower surface 66, can be about 3 mm.

The annular body 62 further includes a peripheral edge 74 and an inner edge 76. In the illustrated embodiment, the peripheral edge 74 is circular and follows the radius of a center point 78. The inner edge 76 defines a central opening 82. As shown in FIGS. 2 and 4, for the illustrated embodiment the inner edge 76 of the annular body 62 is substantially circular and the annular body includes a plurality of inward projections 84 each projecting radially inwardly from the inner edge 76 toward the center point 78. The projections 84 interrupt the circularity of the inner edge 76.

As more clearly seen in FIG. 4, the lower surface 66 of the annular body 62 at each projection 84 is planar or flat. As more clearly seen in FIG. 1, the lower surface 66 of the annular body 62 at the inward projection 84 is co-planar with the planar surface defined by the groove 72. As illustrated, the annular body 62 includes four inward projections 84 where each inward projection is angularly spaced, with respect to the center point 78, about 90 degrees from each adjacent inward projection. A fewer or greater number of inward projections 84 can be provided and the angular space between the inward projections can be changed.

The spacer 12 also includes an outer flange 90 extending from the upper surface 64 of the annular body 62. In the illustrated embodiment, a plurality of outer flanges (four outer flanges are shown in the illustrated embodiment, though more or fewer could be employed) are provided each extending from the upper surface 64 of the annular body 62. With reference back to FIG. 1, each outer flange 90 is configured to contact the wheel rim 22 of the spare wheel assembly 10. The spacer 12 also includes an inner flange 92 extending from the upper surface 64 of the annular body 62. In the illustrated embodiment, a plurality of inner flanges 90 are provided. Each inner flange 90 is offset radially inwardly from a respective outer flange 92. Each inner flange 92 is configured to contact the wheel rim 22 of the spare wheel assembly 10 offset from where the outer flanges 92 are configured to contact the rim. The plurality of outer flanges 90 and the plurality of inner flanges 92 act in concert to maintain the spare wheel assembly 10 securely within the vehicle compartment 14 and to also space the wheel rim 22 from the floor 16 of the vehicle compartment.

As most clearly visible in FIG. 3, each outer flange 90 includes a free end 94 spaced from the upper surface 64 of the annular body 62. With reference back to FIG. 1, the free end 94 of each outer flange 90 contacts at least one of the internal flange 36 and the external flange 38 of the wheel rim 22. In the illustrated embodiment, the free end 94 of the outer flange 90 contacts the external flange 38. If the spare wheel assembly 10 were turned 180 degrees, e.g., flipped, from the orientation shown in FIG. 1, the free end 94 of the outer flange 90 may contact the internal flange 36 of the wheel rim 22. With reference to FIGS. 2 and 3, each outer flange 90 extends substantially perpendicularly from the upper surface 64 of the annular body 62. As most clearly seen in FIG. 2, the outer flange 90, or at least the free end 94 of the outer flange, follows a circular arc having a radius emanating from the center point 78. This allows the free end 94 to engage the internal flange 36 or the external flange 38, which is typically circular when viewed normal to the rotational axis of the spare wheel assembly 10.

As indicated above and as shown in the illustrated embodiment, a plurality, more particularly four, outer flanges 90 are provided on the spacer 12. As illustrated, each outer flange 90 is angularly spaced about 90 degrees from the adjacent outer flange with respect to the center point 78. A fewer or greater number of outer flanges may be provided and the angular spacing between the outer flanges can be changed. As illustrated, each outer flange 90 is substantially aligned with the inner edge 76 of the annular body 62.

As mentioned above, the spacer 12 also includes an inner flange 92 offset radially inwardly from the outer flange 90 and extending from the upper surface 64 of the annular body 62. The inner flange 92 (a plurality of inner flanges are shown in the illustrated embodiment) is configured to contact the wheel rim 22 of the spare wheel assembly 10 offset from where the outer flange 90 is configured to contact the wheel rim. As more clearly seen in FIG. 3, each inner flange 92 includes a distal end 96 that is spaced from the upper surface 64 of the annular body 62. As most clearly seen in FIG. 1, the distal edge 96 of each inner flange 92 contacts at least one of the internal step portion 42 and the external step portion 44 of the cylindrical section 32 of the wheel rim 22. As shown in FIG. 1, the distal edge 96 of each inner flange 92 contacts the external step portion 44. If the spare wheel assembly 10 were to be rotated 180 degrees, e.g., flipped, from the orientation shown in FIG. 1, then the distal edge 96 could contact the internal step portion 42 of the cylindrical section 32 of the wheel rim 22.

As most clearly seen in FIG. 3, each inner flange 92 extends upwardly from the upper surface 64 of the annular body 62 and radially toward the peripheral edge 74 of the annular body 62. Each inner flange 92 extends farther from the upper surface 64 of the annular body 62 as compared to the outer flanges 90. Accordingly, the distal end 96 of each inner flange 92 is spaced farther from the upper surface 64 of the annular body 62 as compared to the free end 94 of each outer flange 90. As most clearly seen in FIG. 2, the respective distal ends 96 of the inner flanges 92 follow a circular arc having a radius emanating from the center point 78. This allows each distal end 96 to contact the internal step portion 42 or the external step portion 44, which is generally circular when viewed normal to the rotational axis of the spare wheel assembly 10. Also in the illustrated embodiment, each inner flange 92 extends from a respective inward projection 84.

The outer flange 90 and the inner flange 92 can be made from the same material as the annular body 62, e.g., metal or a durable plastic. The inner flange 92 can be made from a material that allows the inner flange to flex with respect to the annular body 62 when the distal ends 96 of the inner flanges 92 engage the wheel rim 22. This can provide a friction fit along the external step portion 44 (with regard to the embodiment shown in FIG. 1) to retain the spare wheel assembly 10 against the spacer 12. As most clearly seen in FIG. 2, a plurality of gussets 98 can also be provided to strengthen a respective internal flange 92. In the depicted embodiment, a plurality of gussets 98 are provided with each respective inner flange 92 to connect an upper surface 102 of each respective inner flange 92 with the upper surface 64 of the annular body 62.

In the illustrated embodiment, a plurality of inner flanges 92 are provided. As illustrated, each inner flange 92 is angularly spaced about 90 degrees from each adjacent inner flange. As such, the illustrated embodiment includes four inner flanges. In an alternative arrangement, a fewer or greater number of inner flanges can be provided. As illustrated, each outer flange 90 is substantially aligned with a respective inner flange 92. In other words, in the illustrated embodiment, outer flanges 90 are positioned at the 12 o'clock, the 3 o'clock, the 6 o'clock, and the 9 o'clock position as shown in FIGS. 2 and 4 and inner flanges 92 are also positioned at the 12 o'clock, the 3 o'clock, the 6 o'clock, and the 9 o'clock position. The outer flange 90 depicted in FIG. 1 is configured to contact the wheel rim 22 axially offset (with respect to the rotational axis of the spare wheel assembly 10) from where the inner flange 92 depicted in FIG. 1 is configured to contact the wheel rim. The outer flange 90 depicted in FIG. 1 is also configured to contact the wheel rim 22 radially offset from where the inner flange 92 depicted in FIG. 1 is configured to contact the wheel rim. This allows the flanges 90, 92 to work in concert to retain spare wheel assembly 10 within the vehicle compartment 14.

The annular body 62 also includes a plurality of apertures 110. As illustrated, each respective aperture 110 is positioned between a respective outer flange 90 and a respective inner flange 92. Each aperture 110 is also located within a respective inward projection 84 of the annular body 62. Each aperture extends through the annular body 62 from the upper surface 64 through to the lower surface 66. Were the annular body 62 to be made from metal, each aperture 110 could be formed by punching, which would allow the inner flange 92 to be made from material that was punched from the annular body such that the inner flange is separated from the annular body along three sides thereof while one edge is still connected to the annular body.

A spacer and a spare wheel assembly have been described above with particularity. Various presently unforeseen or unanticipated alternatives, modifications, variations or improvements therein may be subsequently made by those skilled in the art which are also intended to be encompassed by the following claims.

The invention claimed is:

1. A spacer for spacing a spare wheel assembly from a floor of a vehicle compartment, the spacer comprising:
   an annular body including a substantially flat upper surface for facing toward the spare wheel assembly, a lower surface for facing toward the floor and away from the spare wheel assembly, a peripheral edge and an inner edge;
   an outer flange extending upwardly from the upper surface and having a free end spaced from the upper surface and configured to contact a wheel rim of the spare wheel assembly; and
   an inner flange offset radially inwardly from the outer flange and extending upwardly from the upper surface and angled from the upper surface radially toward the peripheral edge, the inner flange being configured to contact the wheel rim of the spare wheel assembly offset from where the outer flange is configured to contact the wheel rim, wherein the annular body includes an aperture extending through the annular body from the upper surface through to the lower surface and substantially radially aligned with and disposed between the inner flange and the outer flange.

2. The spacer of claim 1, wherein the outer flange is configured to contact the wheel rim axially offset from where the inner flange is configured to contact the wheel rim.

3. The spacer of claim 1, wherein the outer flange is configured to contact the wheel rim radially offset from where the inner flange is configured to contact the wheel rim.

4. The spacer of claim 1, wherein the outer flange extends substantially perpendicular from the upper surface.

5. A spacer for spacing a spare wheel assembly from a floor of a vehicle compartment, the spacer comprising:
   an annular body including an upper surface for facing toward the spare wheel assembly, a lower surface for facing toward the floor and away from the spare wheel assembly, a peripheral edge and an inner edge;
   an outer flange extending from the upper surface and configured to contact a wheel rim of the spare wheel assembly; and
   an inner flange offset radially inwardly from the outer flange and extending from the upper surface, the inner flange being configured to contact the wheel rim of the spare wheel assembly offset from where the outer flange is configured to contact the wheel rim,
   wherein the annular body includes an aperture extending through the annular body from the upper surface through to the lower surface and substantially radially aligned with and disposed between the inner flange and the outer flange.

6. The spacer of claim 1, wherein the outer flange is one outer flange of a plurality of outer flanges circumferentially spaced along the annular body.

7. The spacer of claim 6, wherein each outer flange of the plurality of outer flanges is angularly spaced about 90 degrees from each adjacent outer flange of the plurality of outer flanges.

8. The spacer of claim 6, wherein the inner flange is one inner flange of a plurality of inner flanges circumferentially spaced along the annular body.

9. The spacer of claim 8, wherein each outer flange of the plurality of outer flanges is angularly spaced about 90 degrees from each adjacent outer flange of the plurality of outer flanges and each inner flange of the plurality of inner flanges is angularly spaced about 90 degrees from each adjacent inner flange of the plurality of inner flanges.

10. The spacer of claim 5, wherein the outer flange is one outer flange of a plurality of outer flanges and the inner flange is one inner flange of a plurality of inner flanges, each outer flange of the plurality of outer flanges is substantially radially aligned with a respective inner flange of the plurality of inner flanges.

11. The spacer of claim 10, wherein the inner edge is substantially circular and the annular body includes a plurality of inward projections each projecting radially inwardly from the inner edge.

12. The spacer of claim 11, wherein each inner flange of the plurality of inner flanges extends from a respective inward projection.

13. The spacer of claim 12, wherein each aperture is formed through a respective inward projection.

14. The spacer of claim 1, wherein the lower surface is corrugated, and wherein the inner edge is substantially circular and the annular body includes a plurality of inward projections each projecting radially inwardly from the inner edge, wherein the lower surface at each projection is planar.

15. In combination, a spare wheel assembly and a spacer, wherein
   the spare wheel assembly including a tire and a wheel rim, the tire being mounted to the wheel rim and including a two side walls and a central section extending axially between the two side walls, the wheel rim including a cylindrical section and a center piece, the cylindrical section including an internal flange, an external flange axially spaced from the internal flange, an internal step portion and an external step portion axially spaced from the internal step portion,
   the spacer including an annular body having an upper surface contacting at least one of the side walls of the tire, an outer flange extending upwardly from the upper surface having a free end contacting at least one of the internal flange and the external flange of the wheel rim, and an inner flange extending at an angle upwardly from the upper surface and radially toward the peripheral edge, the inner flange having a distal end contacting at least one of the internal step portion and the external step portion of the wheel rim, wherein the annular body includes an aperture extending through the annular body from the upper surface through a lower surface of the annular body and substantially radially aligned with and disposed between the inner flange and the outer flange.

16. The combination of claim 15, wherein the spacer includes a plurality of inner flanges circumferentially spaced along the annular body and a plurality of outer flanges circumferentially spaced along the annular body.

17. The combination of claim 16, wherein each outer flange is angularly spaced about 90 degrees from each adjacent outer flange and each inner flange is angularly spaced about 90 degrees from each adjacent inner flange.

18. The combination of claim 17, wherein each outer flange extends substantially perpendicular from the upper surface, wherein each inner flange extends upwardly from the upper surface and radially toward a peripheral edge of the annular body, and each outer flange is substantially radially aligned with a respective inner flange.

19. The spacer of claim 5, wherein the inner flange extends upwardly from the upper surface and radially toward the peripheral edge.

\* \* \* \* \*